United States Patent
Crano (10) Patent No.: US 7,642,904 B2
(45) Date of Patent: Jan. 5, 2010

(54) RIM MOUNTED PRESSURE MONITORING SYSTEM FOR A TIRE WITH PROTECTED MONITORING MODULE

(75) Inventor: Richard Nicholas Crano, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 408 days.

(21) Appl. No.: 11/803,357

(22) Filed: May 14, 2007

(65) Prior Publication Data

US 2008/0282965 A1    Nov. 20, 2008

(51) Int. Cl.
*B60C 23/02* (2006.01)
(52) U.S. Cl. ............................ 340/442; 73/146.2
(58) Field of Classification Search ......... 340/442–448; 73/146.2–146.8
See application file for complete search history.

(56) References Cited

U.S. PATENT DOCUMENTS 3,185,960 A * 5/1965 Howard et al. ............. 340/442
3,508,193 A * 4/1970 Giovannelli et al. ........ 340/442
4,644,317 A * 2/1987 Aingworth ................. 340/447

\* cited by examiner

*Primary Examiner*—Jeffery Hofsass
(74) *Attorney, Agent, or Firm*—Richard B. O'Planick (57) ABSTRACT

A tire and wheel rim assembly includes a tire supporting rim having an outward facing mounting surface and at least one tire body mounted to the rim and positioning an internal tire cavity over the rim mounting surface. A tire pressure monitoring module assembly mounts to the rim mounting surface and includes a housing having an internal pressure chamber; a pressure sensing device and/or a temperature measuring sensor within the housing pressure chamber; and an elongate connecting member extending through the housing and the rim mounting surface. A crossover pipe connects the housing pressure chamber with a remote portion of the rim. The inflation pressure in the tire cavity is transferred through the axial passageway of the crossover pipe to the pressure chamber within the module housing.

15 Claims, 10 Drawing Sheets

RIM MOUNTED PRESSURE MONITORING SYSTEM FOR A TIRE WITH PROTECTED MONITORING MODULE

FIELD OF THE INVENTION

The invention relates generally to tire pressure monitoring systems and, more specifically, to housing assemblies for such systems.

BACKGROUND OF THE INVENTION

Typical commercially available tire pressure monitoring system units are mounted to the inside of a tire in a position from which the air pressure within the tire cavity may be measured. Data representing pressure within the tire is then communicated by a transmitted signal to a reader external to the tire. For example, certain available units integrate a pressure sensing module with the valve stem of a tire. Electronics within the sensor unit measure the air pressure at the valve stem and transmit an appropriate signal to an external receiver. The receiver may be located proximally located to the sensor unit or in a remote location such as the passenger compartment.

While working well, such systems are not useful in meeting the industry's needs in certain applications. For example, in some applications such as in NASCAR race tires, there is a need for a tire pressure-measuring device that may be used conveniently in a two tire system by officials to check start inflation pressure. Such a system should functionally measure inflation pressure without requiring an official to touch the tire. A suitable pressure measuring system will give a positive indication of specific tire read and, for competition reasons, preclude one team from reading another team's tire information. In addition, the pressure measuring system and device must be capable of validation with a mechanical pressure gauge if necessary. In such applications, the tire pressure measuring device should be hardy and capable of surviving multiple races. Ideally, the device will be a standard supported component of the tire/wheel assembly. The operation of the device should further be capable of operational verification before the tire/wheel assemblies are released for control purposes and function without requiring an electromagnetic radiation shield.

An additional hurdle in the development of a suitable pressure measuring device for NASCAR or racing applications is that the tire employed in such applications is typically a dual tire system. The system uses an inner and outer tire, both seated at respective locations on a common rim. When properly seated the inner tire (which has higher inflation than the outer tire) pushes the beads of both tires against the rim flange. The inner tire has molded grooves to allow the inflation pressure in the outer chamber to reach the area adjacent to the flange between the two beads. The pressure measuring device is intended to measure the outer tire pressure and must be capable of accessing and measuring air pressure within the region between the inner and outer tires in a manner that does not interfere with tire performance or conflict with the accomplishment of the other objectives summarized above.

A further obstacle to achieving a satisfactory tire pressure measuring system is the need for such a system to communicate reliably with a remote receiver mounted on the vehicle. The tire pressure monitoring module may include a passive device that communicates with a remote receiver by means of RF signal. The RF signal from a passive device may not be strong enough to reach the receiver antenna mounted on the vehicle if subjected to interference from the tire rim. Accordingly, there is a need for a tire pressure monitoring system that allows for measurement of air pressure within one or more tires mounted on a rim while facilitating reliable communication of tire pressure data between the module and a receiver antenna mounted on the vehicle.

SUMMARY OF THE INVENTION

Pursuant to one aspect of the invention, a tire and wheel rim assembly includes a tire supporting rim having an outward facing mounting surface and at least one tire body mounted to the rim positioning an internal tire cavity over the rim mounting surface. A tire pressure monitoring module assembly is affixed to the rim mounting surface within the tire body internal tire cavity, the module assembly including a housing mounted to the rim mounting surface. The housing has an internal pressure chamber; a pressure sensing device within the housing pressure chamber; and a portal communicating with the internal housing pressure chamber and a selective region along the rim mounting surface. The air pressure at the selective region is communicated through the portal to the internal housing pressure chamber.

According to another aspect of the invention, the portal is configured to include crossover pipe having an axial passageway. The crossover pipe extends at least partially along an outward side of the rim opposite the rim mounting surface. A crossover pipe first end connects through the rim to the module assembly housing and a crossover pipe second end extends through the rim at a pressure monitoring location. The pressure level at the pressure monitoring location is transferred through the axial passageway of the crossover pipe to the pressure chamber within the module housing.

In a further aspect of the invention, a second tire is mounted to the rim mounting surface and includes an internal second tire cavity enclosing the crossover pipe second end.

Pursuant to another aspect of the invention, the pressure sensing device includes means for transmitting a measured pressure value to an external receiver along a communication path routed so as to avoid intersecting the rim. The tire pressure module is thus protected from mechanical damage because it is in the tire cavity. The crossover pipe is functional for both dual and single tire applications. In applications lacking an inner tire, the crossover pipe functions to supply the tire pressure monitoring module with the correct tire cavity inflation pressure of the outer tire. In single tire applications, pursuant to an aspect of the invention, the crossover pipe may be eliminated and the tire pressure monitoring module housing supplied with a vent port. The port between the two tire chambers can be made flush with the wheel surface so as to not interfere with the tire bead.

BRIEF DESCRIPTION OF THE DRAWINGS

The invention will be described by way of example and with reference to the accompanying drawings in which.

DETAILED DESCRIPTION OF THE INVENTION

With reference to FIGS. 1, 1A, 2, 3, and 3A a tire, rim, and tire pressure monitoring module assembly 10 is shown. The rim 12 is of a conventional rim configuration. A two tire system, such as that used in NASCAR racing is depicted for the purpose of illustration, it being understood that the subject rim mounted tire pressure monitoring system is capable of utilization in a single tire and rim application. A pair of spaced apart tire bodies 14, 16 of conventional tire configuration is mounted to the rim 12, the tire body 16 representing an inner tire and the tire body 14 representing an outer tire. The inner tire 16 functions to maintain stability in the event the outer tire 14 is damaged or otherwise deflates. In a two tire system such as that shown, both tires are mounted to a common rim internal surface region 20. With the beads of the tire bodies 14, 16 properly seated on surface 20, the inner tire 16 (which has higher inflation pressure than the outer tire) pushes both beads against the rim flange 22. The inner tire 16 is formed to provide molded grooves 88 to allow the inflation pressure in the cavity 30 of the outer tire 14 to reach the area adjacent to the flange between the two beads for tire pressure measurement.

As described above, the air pressure within the tire cavity 32 of the inner tire 16 is maintained higher than the pressure of the outer tire body 14. In order to achieve competitive equality between racing cars and for safety considerations, the air pressure within the tire body 14 is monitored. A tire pressure monitoring module 18 is employed for this purpose. Module 18 is mounted to an outward facing rim surface 104 preferably although not necessarily on a drop center portion of the rim. As best seen from a collective consideration of FIGS. 1, 1A, 2, 3, and 3A the module 18 includes a casing or housing 34, an end cap 36, an insert body 38, a gasket 40, a circuit board 41, a sealing washer 42, and bolt 44.

With reference to FIGS. 4, 5, 6, and 7, the module housing 34 includes an internal pressure chamber 46 enclosed by three sidewalls 47. An internal shoulder 48 is formed within the chamber 46 opposite an open side 58. A generally circular collar 52 projects from the housing 34 and an annular shoulder 50 projects into a collar passageway 56. The passageway 56 extends through the collar 52 and the annular shoulder 50 into communicating relationship with the chamber 46. A pair of circuit board supporting rail flanges 54 extend along the interior of the housing 34 as shown and a flat surface 57 is formed in a side of the collar defining bore 56. The housing 34 may be formed from any suitable material such moldable thermoplastic or thermoset plastics material having sufficient temperature and strength characteristics for strength and dimensional stability in a tire/wheel rim environment.

Figure 19:
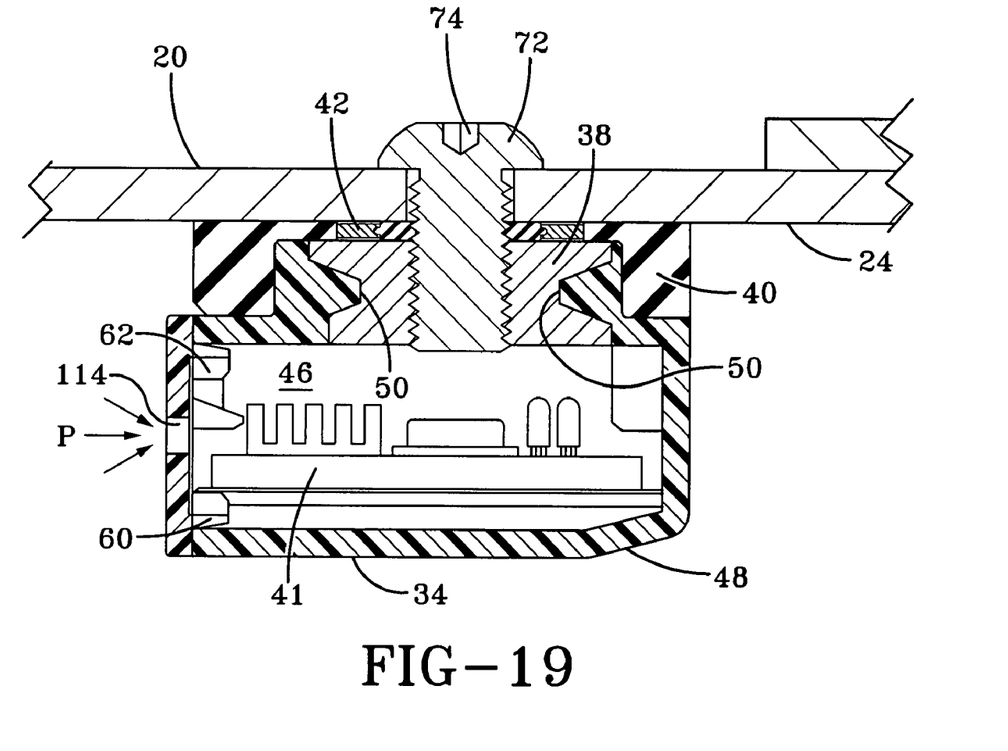
FIG. 19 is a transverse section view through a TPMM having a non-crossover configuration.
Figure 20:
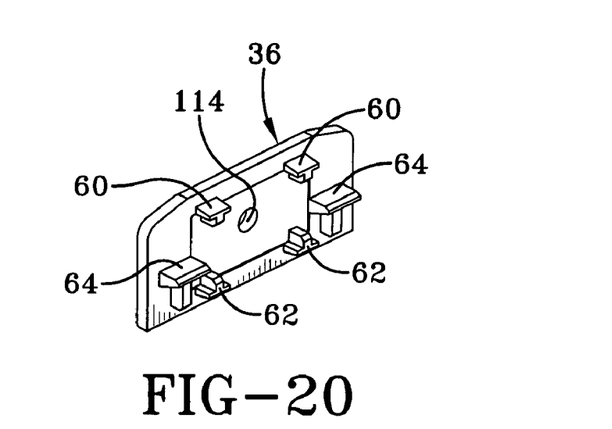
FIG. 20 is a perspective view of the endcap for the TPMM housing of FIG. 19.

As shown in FIGS. 10, 11, 12, and 13, the end cap 36 is a generally rectangular cap formed of suitable material such as the material of housing 34. The end cap is attached securely to the housing 34 by laser welding, ultrasonic welding, adhesive or other suitable means to enclose the opening 58 and includes a pair of integrally molded projecting protrusions 60 and a pair of protrusions 62. Protrusions 60, 62 locate the end cap 36 into the housing opening. The end cap 36 further has spaced apart pair of T-shaped protrusions 64. The circuit board 41 is inserted through the opening 58 and positioned on the support rail flanges 54. The board may then be slid into the chamber 46 of housing 34 until abutment. Thereafter, the end cap 36 is securely attached by appropriate means to the housing 34 over the opening 58. Secure attachment of end cap 36 to the housing 34 creates an airtight seal between the end cap and the housing such that air within the chamber 46 cannot escape. Protrusions 64 engage the circuit board 41 within the chamber 46 to fix the board 41 in place and deter movement of the board within the housing 34. The end cap 36 is modified in one embodiment to include a through aperture 114 as shown in FIGS. 19 and 20 to allow air pressure outside of the end cap and housing 34 to be measured by a pressure measuring device within chamber 46. In a second embodiment, the aperture 114 is eliminated to allow for pressure measurement remote from the housing 34 as will be explained.

Figure 8:
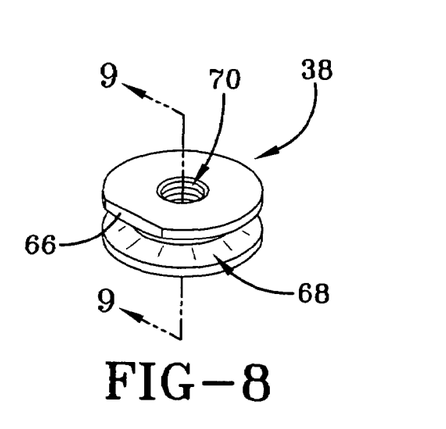
FIG. 8 is a top perspective view of the insert body.
Figure 9:
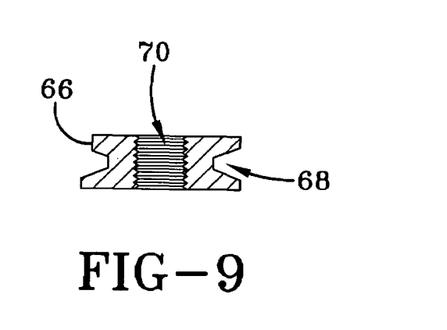
FIG. 9 is a transverse section view through the insert body taken along the line 9-9 of FIG. 8.
Figure 10:
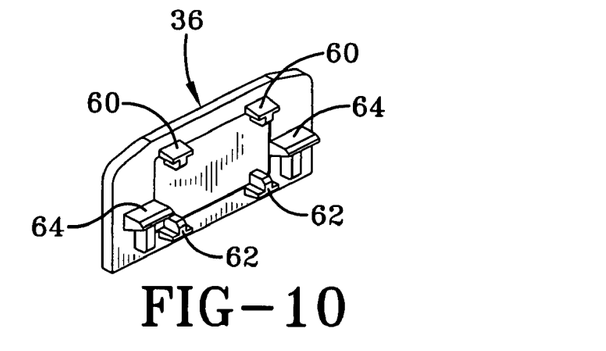
FIG. 10 is a front perspective view of the housing end cap.
Figure 11:
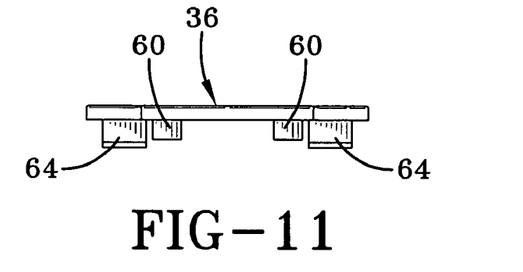
FIG. 11 is a side elevation view of the housing end cap.
Figure 12:
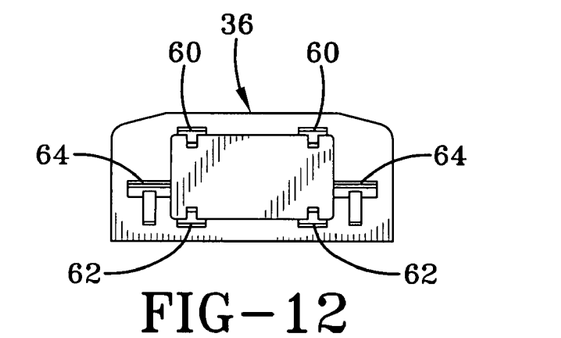
FIG. 12 is a front elevation view of the housing end cap.
Figure 13:
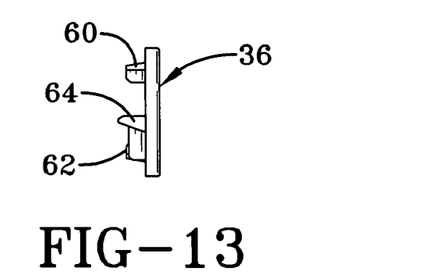
FIG. 13 is an end elevation view of the housing end cap.

As will be appreciated from FIGS. 8 and 9, the insert body 38 is dimensioned and configured to seat within the housing opening 56 and includes a flat surface 66 so that the insert body 38 is constrained from rotating within the housing collar 52. The annular shoulder 50 of the collar 52 is positioned within an annular groove 68 in the insert body 38 and acts to locate and secure the insert body within the collar 52. The insert body 38 is formed having a threaded through bore 70. The body 38 may be formed of any suitable material having requisite strength. The insert body 38 is preferably although not necessary formed of stainless steel having internal threads to accept the mounting bolt 44. The bolt 44 is likewise preferably formed of metal. Washer 42 is preferably formed of a composite material. The metal to metal contact between the insert body 38, the washer 42, the bolt 44 and the rim 12 eliminates compression stress on the plastic housing 34.

Figure 1:
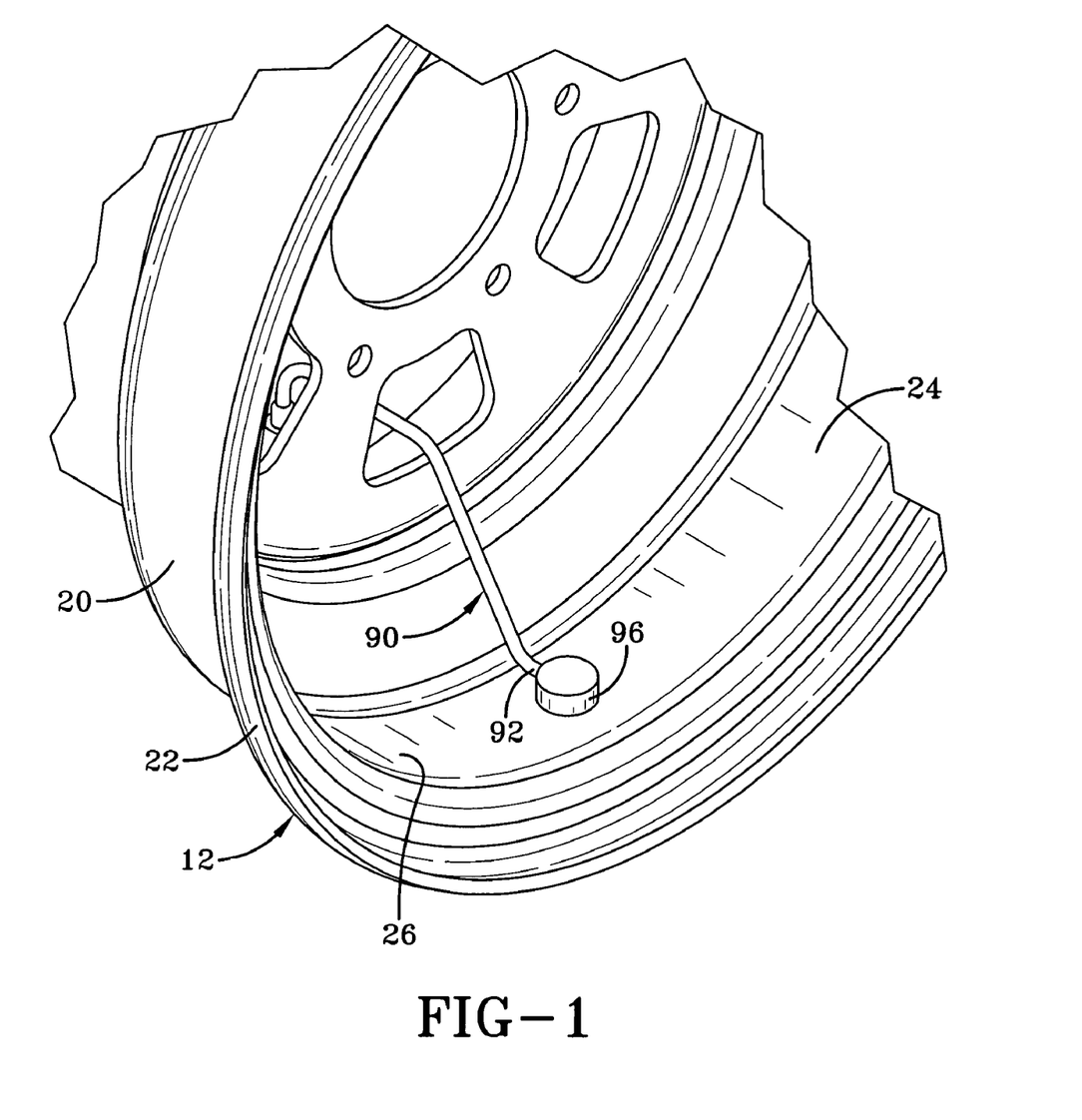
FIG. 1 is a perspective view of a tire rim portion having a tire pressure monitoring module (TPMM) mounted thereto.
Figure 1A:
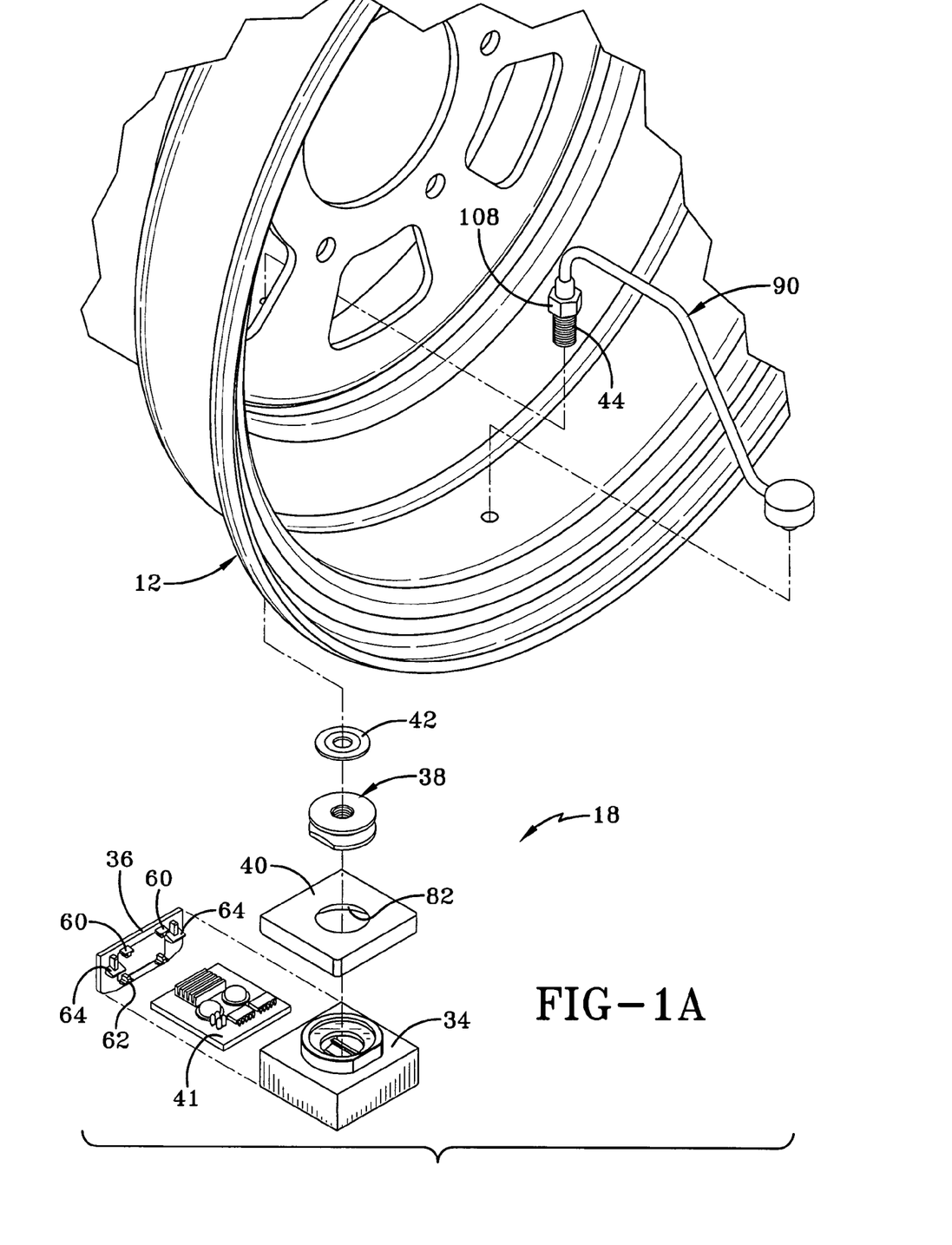
FIG. 1A is an exploded perspective view of a rim portion and tire pressure monitoring module configured pursuant to the invention.
Figure 2:
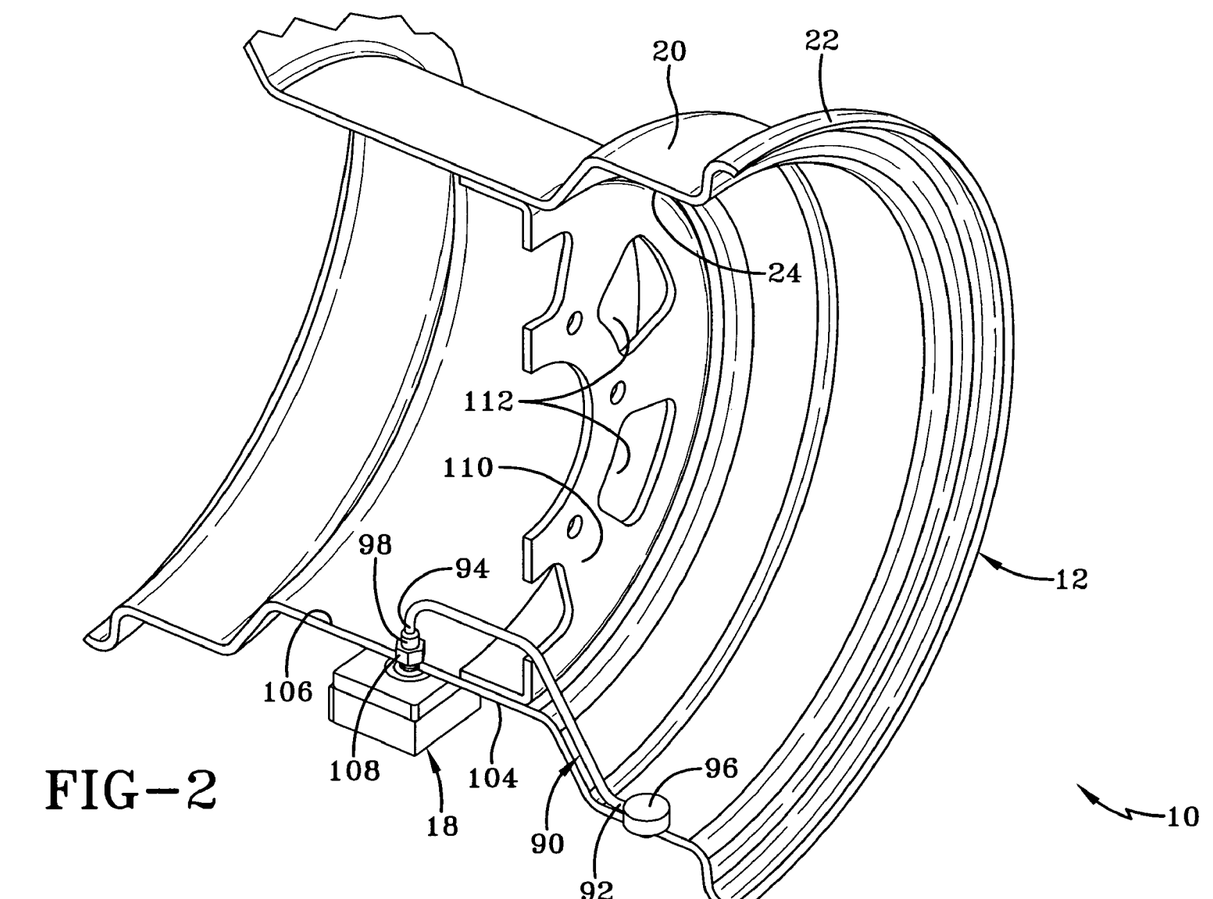
FIG. 2 is an enlarged perspective view of a rim portion partially sectioned to show the TPMM.
Figure 3:
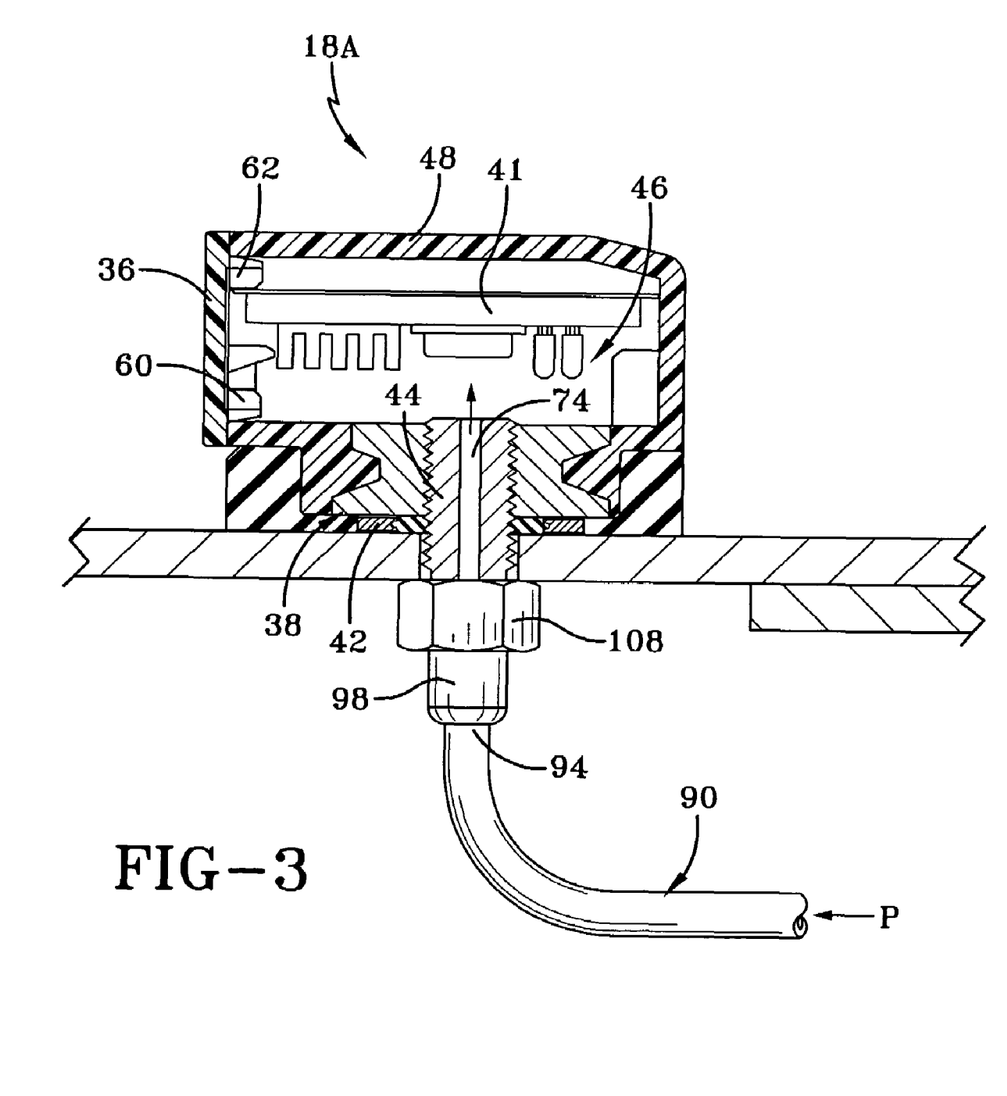
FIG. 3 is a transverse section view through the tire pressure monitoring module mounted to a rim.
Figure 3A:
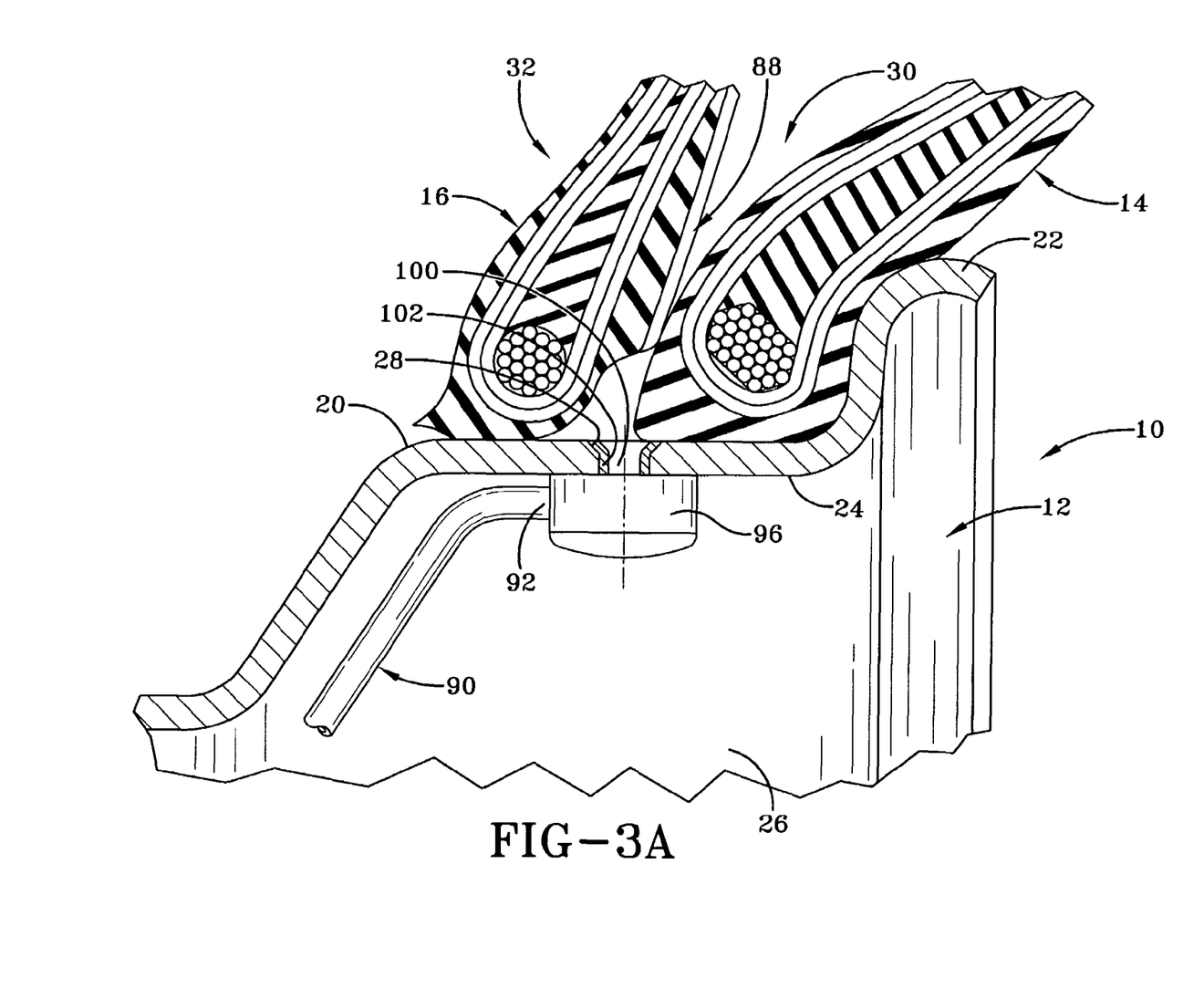
FIG. 3A is a transverse section view of a rim portion having dual tires mounted thereto and showing positioning of a terminal end of the crossover pipe.
Figure 4:
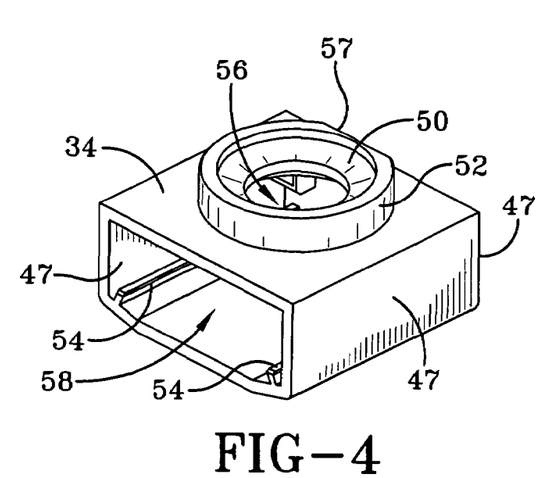
FIG. 4 is a perspective view of the TPMM housing.
Figure 5:
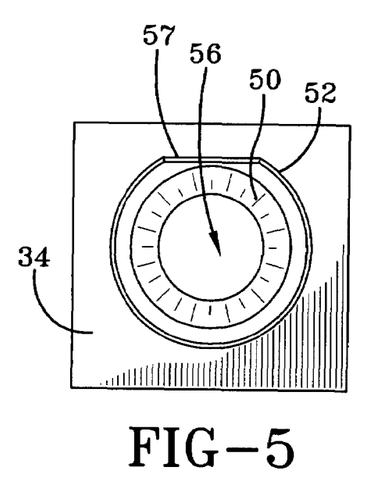
FIG. 5 is a top plan view of the TPMM housing.
Figure 6:
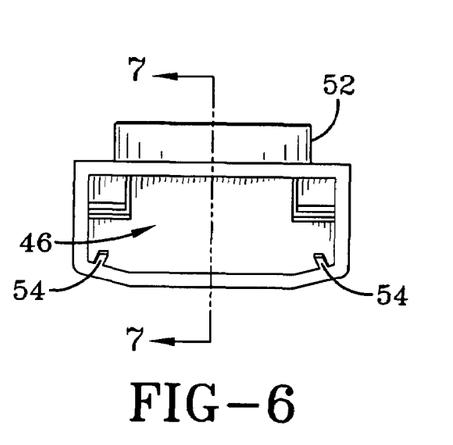
FIG. 6 is a front elevation view of the TPMM housing.
Figure 7:
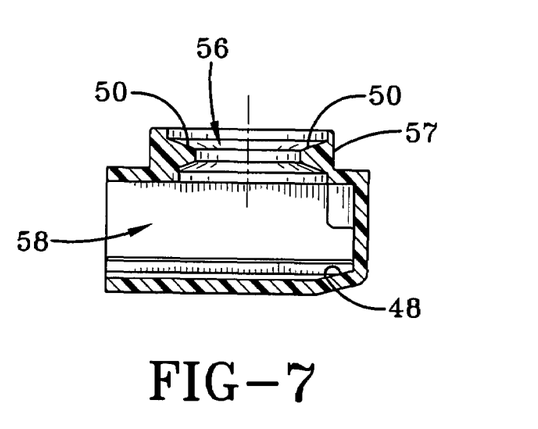
FIG. 7 is a transverse section view through the TPMM housing taken along the line 7-7 of FIG. 6.
Figure 17:
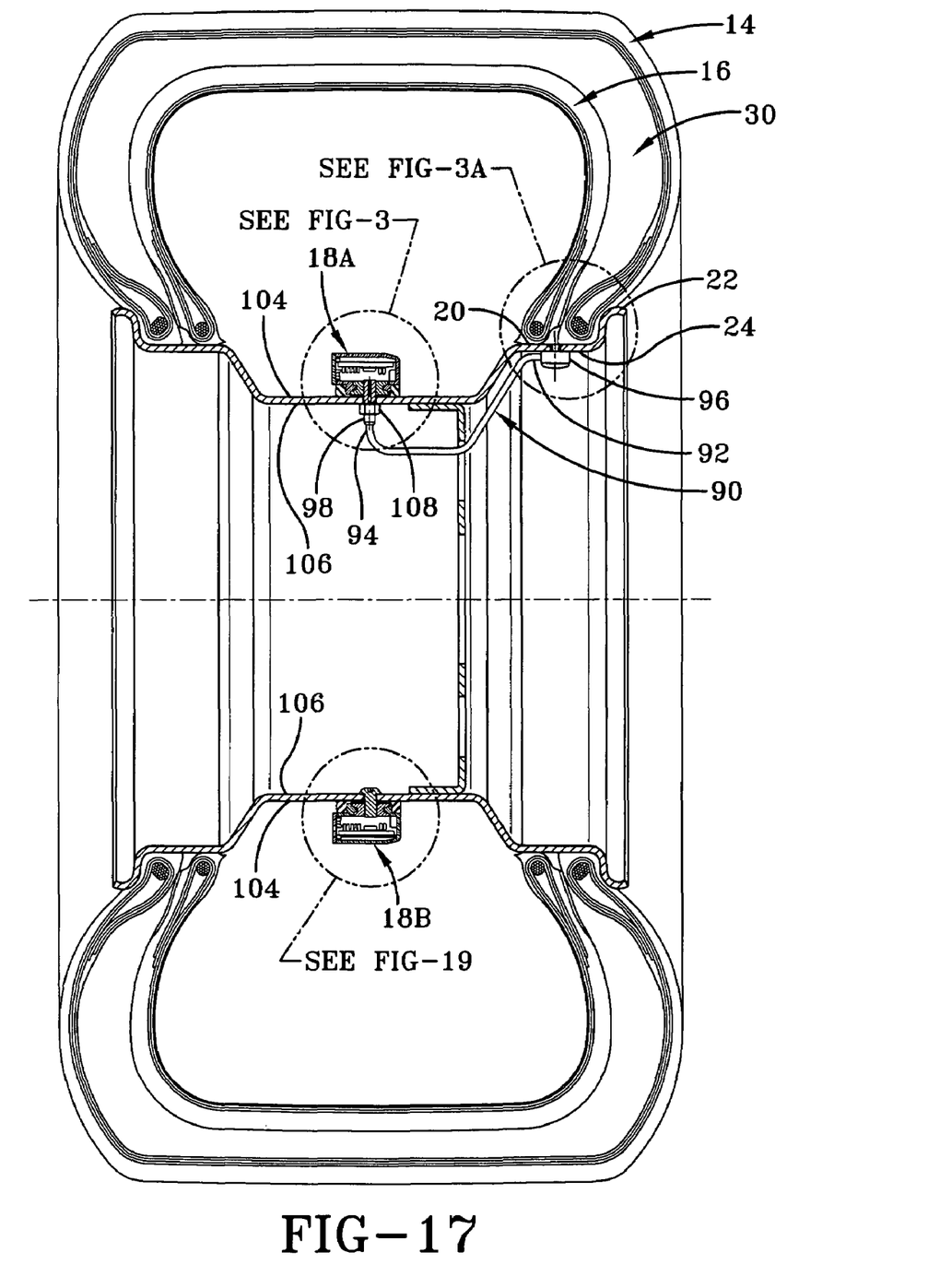
FIG. 17 is a section view through a dual tire and rim system showing two TPMMs mounted to the rim in a crossover and a non-crossover configuration, respectively.

The tire pressure monitoring module 18 may be utilized in several embodiments depending on the application. FIG. 17 shows the module in two different configurations, configuration 18A shown in a crossover application in which the air pressure within the outer tire 14 is monitored, and configuration 18B in which the air pressure of the inner tire 16 is monitored. There may be multiple TPMM utilized if desired wherein the air pressure in both the inner and outer tires are measured as in FIG. 17. FIGS. 3 and 3A illustrate in detail the configuration 18A and FIG. 19 illustrates in detail the configuration of the 18B configuration. The TPMM system in either configuration 18A or 18B is preferably but not necessarily located on the equatorial centerline of the rim. So located the TPMM does not create a significant imbalance in the rim and is protected within the tire cavity from contact with outside agents. In addition, while the TPMMs of FIG. 17 are shown in a two tire system, the invention is not intended to be so limited and either configuration 18A or 18B may be utilized in a single tire application.

Figure 18:
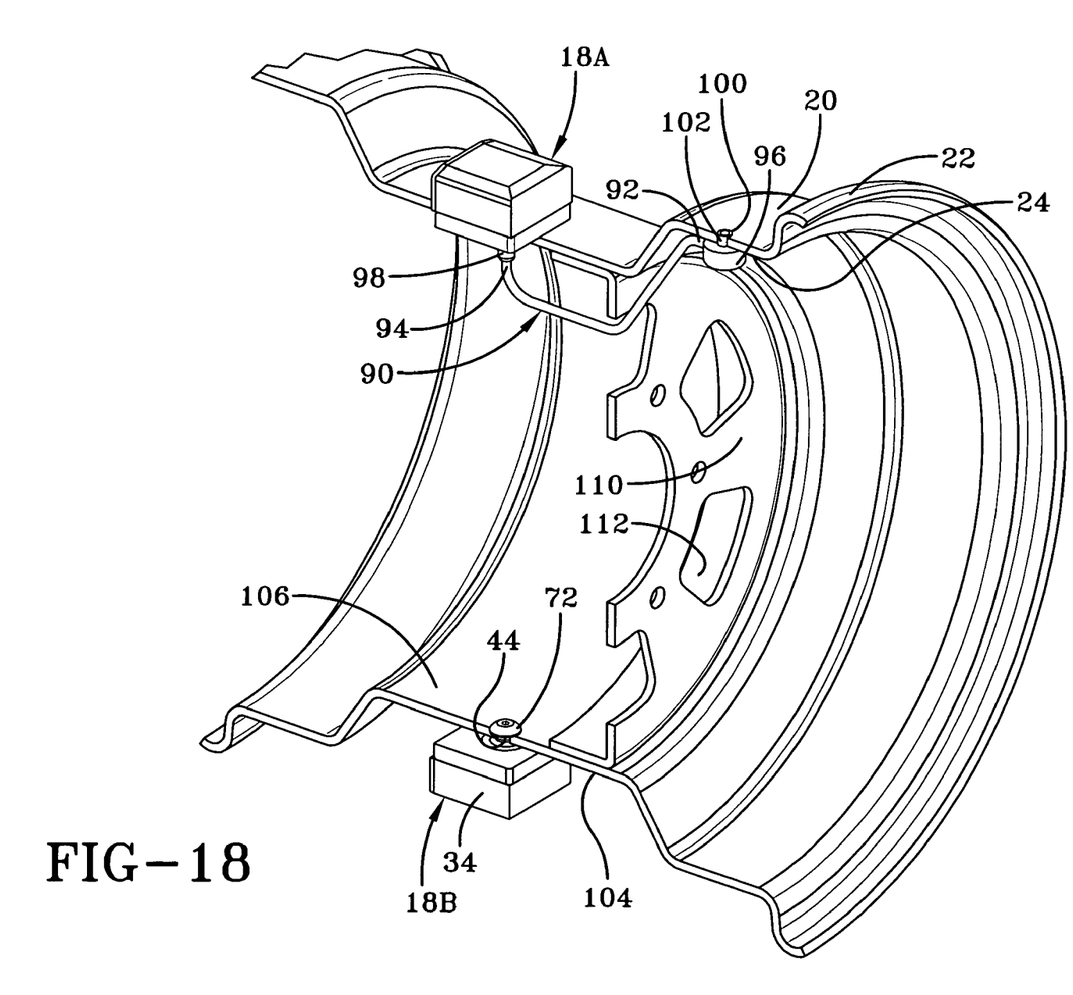
FIG. 18 is an enlarged perspective view of the dual TPMMs of FIG. 17.

Referring to FIGS. 18 and 19, in the TPMM 18B configuration the mounting bolt 44 is externally threaded and includes a bolt head 72. The bolt may be approximately ¼ inches in length. A passageway 114 is centrally disposed through the end cap 36 whereby exposing the internal pressure chamber 46 within housing 34 to the ambient pressure within the tire cavity.

Figure 14:
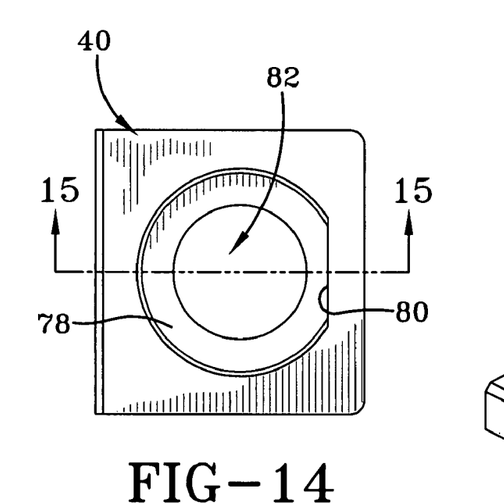
FIG. 14 is a plan view of the gasket component of the TPMM.
Figure 15:
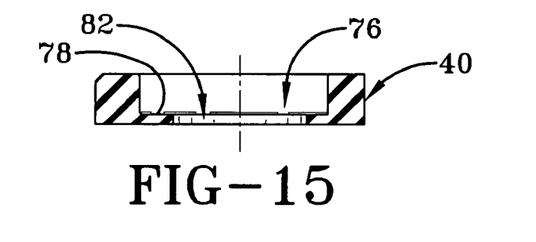
FIG. 15 is a sectional view through the gasket taken along the line 15-15 of FIG. 14.
Figure 16:
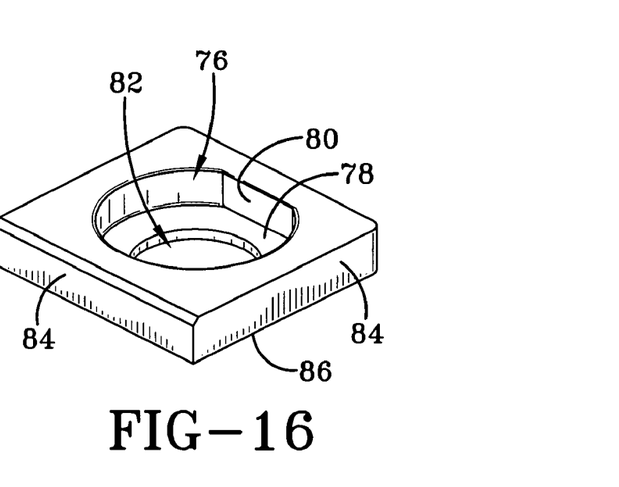
FIG. 16 is a front perspective view of the gasket.

FIGS. 14, 15, and 16 illustrate the gasket 40 in detail. The gasket 40 includes sidewalls 84 and having a wall 86. A larger dimensioned chamber 76 of circular cross-sectional configuration extends into the gasket wall 86 to an annular flange 78. A flat surface 80 defines a side of the chamber 76 within the gasket. An opening 82 of reduced diameter extends from the annular flange 78 to an opposite side of the gasket. The gasket is formed of a high temperature material such as a fluoro-elastomeric material. The washer 42 may likewise be formed of a high temperature material such as a composite metal and fluoro-elastomeric material.

The transponder board 41 may include temperature and pressure measuring devices common to the industry. In addition, the board 41 may include ID data storage and calibration constants. Operation of the board 41 is to monitor and measure temperature and/or pressure within the tire 14 or the tire 16 and communicate a signal representing measured values to an external reader (not shown). Devices suitable for use for such a purpose are common and commercially available.

The tire pressure monitoring module 18 in either configuration 18A or 18B is mounted to the rim 12 as will be apparent from FIGS. 1, 1A, 2, 3, 3A, 17 preferably on the equatorial centerline. The TPMM 18 is thus within the cavity of the tire body 16. Within the tire cavity and secured to surface 104 of the rim, as discussed, the module 18 is protected from contact with external agents that might otherwise damage the module. Moreover, mounting the module 18 on the centerline of the rim in the preferred location will not cause an imbalance in the rim and tire assembly. The circuit board 41 is sealed within the pressure chamber of the housing 34 by the end cap 36. The bolt extends through the rim. The washer 42 receives the bolt shaft therethrough and abuts against surface 24 of the rim to prevent air from leaking from around the bolt. The housing collar portion 52 receives the insert body 38 therein with the annular flange 50 of the housing 34 entering into the annular groove 68 of the insert body. The gasket 40 is positioned over the housing 34 and receives the collar portion 52 of the housing 34 into the gasket opening 76. Flat surface 57 of the collar 52 registers opposite the flat surface 80 of the gasket 40 to prevent relative rotation from occurring between the gasket and the housing. The washer 42 is inserted into and seats within the gasket opening 82.

The threaded shaft of bolt 44 extends through the washer 42 and the gasket 40 and threads into the insert body threaded bore 70. The tire pressure module 18 is thus firmly affixed to the rim surface 104. In configuration 18B, in the attached and mounted position, the internal pressure chamber 46 of housing 34 is in direct communication with the internal pressure of tire 16 through aperture 114 and accesses the electronics on circuit board 41 for measuring temperature/pressure. The enclosed electronics within the chamber 46 sense the pressure and transmit an appropriate signal to an external reader.

As seen from FIGS. 1, 1A, 2, 3, 3A, 17, and 18, tire pressure monitoring module 18 in configuration 18A includes an elongate crossover pipe 90 extending between opposite pipe ends 92, 94. The pipe ends 92, 94 are terminated respectively into fitting caps 96, 98. The pipe 90 has an axial passageway 100 extending between ends 92, 94. A cylindrical sleeve 102 extends from the cap 92 through a passageway 100 within the rim as best seen in FIG. 3A. Air pressure within the internal cavity of tire 14 is communicated by way of pipe 90 into the pressure chamber 46 of the housing 34. The bolt 44 in configuration 18A extends through the rim from center rim surface 104 to surface 106. The bolt 44 is configured having an axial through bore 74 and is secured to the center rim portion by means of a threaded hole in the rim, locked in place by nut 108. The bolt 44 couples with the fitting cap 98 to secure the pipe end 94 to the rim. In racing applications channels 88 are formed within the surface of tire body 16 as shown. The pressure within the tire body 14 is thus communicated end to end through the crossover pipe 90 into the pressure chamber 46 of housing 34. Other methods of creating airtight seals, such as various types of compression fittings, could also be used.

The crossover pipe 90 projects through the rim and follows closely along the opposite side 106 through rim portals 112 in a rim wall 110. The pipe 90 proceeds to end 92 at cap fitting 96 and there proceeds back through the rim by sleeve 102 into the cavity of tire body 14. It is preferred that the pipe 90 follow the rim as closely as possible along its intended path with a minimal separation.

From the foregoing, it will be readily apparent that the subject system that mounts the pressure monitoring module 18 directly to the rim 12 achieves significant advantages. Inflation pressure may be measured without touching the tire(s) and a positive indication of specific tire pressure in the outer tire may be accurately read. The data transmission protocol within each module 18 may be designed to prevent one racing team from reading another team's tire/rim/module systems. Since the valve stem of the tires is not engaged by the subject invention module 18, a mechanical pressure gauge may be used on the valve stem if desired to validate the measurement of the module 18. Such a redundancy and cross-verification can insure that a correct determination of the tire pressure is made. The module 18 mounts on the centerline of the rim 12 and is thus protected and can survive multiple races in contrast with tire mounted devices that must endure the forces imposed on the devices by the tire. The module 18 may be incorporated as a standard component of a tire/wheel assembly and the operation of the module may be verified before the tire/wheel assembly is released from production. The electronics within the module 18 may further work with or without electro-magnetic transmission shields. One or more than one module(s) 18 may be employed if desired monitoring the same or differing cavities within the tire components.

It will be appreciated that the mounting location of the module 18 and the crossover pipe 90 allows mounting the module on the outside diameter of the rim in the center. So positioned, the module 18 may communicate with a remote receiver on the vehicle along a communication path that does not intersect with the rim. By avoiding rim-induced interference, RF signals from the module 18 may reach the receiving antenna mounted on the vehicle. The RF signals utilized may pass through the one or two tires but cannot pass through the rim. Thus, by location of the module 18 pursuant to the invention, the rim is avoided and effective and reliable communication between the module 18 and its associate receiver is assured. For inner and outer tire applications where the inflation of the outer tire is the desired measured parameter, the crossover pipe 90 effectively connects a port on the inside diameter of the rim with the outer tire chamber and carries the outer tire inflation pressure to a port connecting with module 18. The module 18 is protected from mechanical damage because it is in the tire cavity.

The crossover pipe is functional for both dual and single tire applications while module 18 may be configured as shown in embodiments 18A and 18B. For single tire applications, the crossover pipe may be eliminated and the housing cover provided with a vent port 114 (embodiment 18B). The port 102 between the two tire chambers can be flush with the wheel surface so as to not interfere with the tire beads of bodies 14, 16. Moreover, it will be appreciated that the stress on the housing 34 is minimized by its location within the tire cavity. For the inner and outer tire applications the housing 34 must withstand only the differential pressure between the two chambers. For the single tire application the housing sees the same internal and external pressure.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and wheel rim assembly comprising:
   a tire supporting rim having an outward facing mounting surface;
   at least one tire body mounted to the rim positioning an internal tire cavity over the rim mounting surface;
   at least one tire pressure monitoring module assembly affixed to the rim mounting surface within the tire body internal tire cavity, the module assembly comprising: a housing mounted to the rim mounting surface, the housing having an internal pressure chamber; a pressure sensing device within the housing pressure chamber; and a portal communicating with the internal housing pressure chamber and selective alternative regions along the rim mounting surface, wherein the air pressure at the selective alternative regions is communicated through the portal to the internal housing pressure chamber.

2. An assembly according to claim 1, wherein the portal comprises a crossover pipe having an axial passageway, the crossover pipe extending at least partially along an outward side of the rim and having opposite first and second ends, the crossover pipe first end connecting through the rim to the module assembly housing and the crossover pipe second end extending through the rim at a pressure monitoring location.

3. An assembly according to claim 2 wherein the pressure level at the pressure monitoring location is transferred through the axial passageway of the crossover pipe to the pressure chamber within the module housing.

4. An assembly according to claim 3, wherein a second tire is mounted to the rim mounting surface and includes an internal second tire cavity enclosing the crossover pipe second end.

5. An assembly according to claim 4, wherein the pressure sensing device includes means for transmitting a measured pressure value to an external receiver along a communication path, wherein the communication path avoids intersecting the rim.

6. An assembly according to claim 1, wherein the pressure sensing device includes means for transmitting a measured pressure value to an external reader device along a communication path, wherein the communication path avoids intersecting the rim.

7. An assembly according to claim 6, wherein the housing is substantially composed of plastics material.

8. An assembly according to claim 6, wherein the tire pressure monitoring module assembly is mounted substantially on a centerline of the rim mounting surface.

9. An assembly according to claim 1, wherein the tire pressure monitoring module is mounted substantially on a centerline of the rim mounting surface.

10. A tire and wheel rim assembly comprising:
    a tire supporting rim having an outward facing mounting surface;
    at least one tire body mounted to the rim positioning an internal tire cavity over the rim mounting surface;
    at least one tire pressure monitoring module assembly comprising: a housing secured to the rim mounting surface, the housing having an internal pressure chamber; a pressure sensing device within the housing pressure chamber including communication means for transmitting measured tire pressure to a remote receiver along a communication path; and an elongate crossover pipe having an axial passageway, the crossover pipe extending at least partially along an outward side of the rim and having opposite first and second ends, the crossover pipe first end connecting through the rim to the module assembly housing and the crossover pipe second end extending through the rim at a pressure monitoring location.

11. An assembly according to claim 10 wherein the pressure level at the pressure monitoring location is transferred through the axial passageway of the crossover pipe to the pressure chamber within the module housing.

12. An assembly according to claim 11, wherein a second tire is mounted to the rim mounting surface and includes an internal second tire cavity enclosing the crossover pipe end.

13. An assembly according to claim 10, wherein the communication means transmits a measured pressure value to an external receiver along a communication path that avoids intersecting the rim.

14. An assembly according to claim 13, wherein the tire pressure monitoring module is mounted substantially on a centerline of the rim mounting surface.

15. An assembly according to claim 10, wherein the tire pressure monitoring module is mounted substantially on a centerline of the rim mounting surface.

* * * * *